United States Patent
Rydelek et al.

(10) Patent No.: US 6,264,379 B1
(45) Date of Patent: Jul. 24, 2001

(54) CAMERA WITH CARRY STRAP HAVING ORNAMENTAL FIGURE

(75) Inventors: James G. Rydelek, Henrietta; Brett Z. Blaisdell, Rochester; Steven S. Chapman, Corfu, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/318,444

(22) Filed: May 25, 1999

(51) Int. Cl.$^7$ .................................................. G03B 17/00
(52) U.S. Cl. ........................... 396/423; 396/544; 224/908
(58) Field of Search .................................... 396/420, 423, 396/535, 544, 422; 224/908, 909; D16/242, 243

(56) References Cited

U.S. PATENT DOCUMENTS

| | | | |
|---|---|---|---|
| 2,130,262 | * | 9/1938 | Burlin .................................... 396/423 |
| 3,936,845 | * | 2/1976 | Morse .................................... 396/423 |
| 4,637,535 | * | 1/1987 | Aleman ................................. 224/908 |
| 4,736,220 | * | 4/1988 | Heinzelmann ........................ 396/544 |
| 4,864,333 | * | 9/1989 | Barber .................................. 396/544 |
| 5,054,128 | * | 10/1991 | Wimmer ................................... 2/300 |
| 5,115,264 | | 5/1992 | Schappler . |
| 5,552,850 | * | 9/1996 | Matsumoto ............................ 396/544 |
| 5,557,345 | * | 9/1996 | Katzenmeyer et al. ................ 351/66 |
| 5,805,944 | * | 9/1998 | Barclay et al. ....................... 396/423 |
| 6,050,119 | * | 4/2000 | Potts ....................................... 70/456 |
| 6,064,823 | * | 5/2000 | Solomon ............................... 396/423 |
| 6,134,388 | * | 10/2000 | Balling et al. ....................... 396/423 |

* cited by examiner

*Primary Examiner*—Alan A. Mathews
(74) *Attorney, Agent, or Firm*—Roger A. Fields

(57) ABSTRACT

A camera comprising a housing, and a carry strap attached to the housing to permit the carry strap to be longitudinally extended from the housing as a closed loop to receive one's hand in the closed loop and being elastic to be stretched around the housing to be stored on the housing, is characterized in that the carry strap has an ornamental figure which is arranged to be upstanding from the housing when the carry strap is stretched around the housing to be stored on the housing. Preferably, the carry strap has an integral platform that is wider than the remainder of the carry strap to serve as a support base for the ornamental figure. The platform is positioned on a top face of the housing, and the ornamental figure is upstanding on the platform, when the carry strap is stretched around the housing to be stored on the housing.

4 Claims, 3 Drawing Sheets

CAMERA WITH CARRY STRAP HAVING ORNAMENTAL FIGURE

FIELD OF THE INVENTION

The invention relates generally to the field of photography, and in particular to cameras with carry or wrist straps. More specifically, the invention relates to a camera with a carry or wrist strap having an ornamental figure.

BACKGROUND OF THE INVENTION

It is well known for a camera a to include a flexible carry or wrist strap. The carry strap is attached to the housing of a camera to permit the carry strap to be longitudinally extended from the housing as a closed loop, to receive one's hand in the closed loop.

Prior art U.S. Pat. No. 5,115,264 issued May 19, 1992 discloses that the carry strap can be stretched around the front, rear, top and bottom faces of the housing to be stored on the housing.

SUMMARY OF THE INVENTION

A camera comprising a housing, and a carry strap attached to the housing to permit the carry strap to be longitudinally extended from the housing as a closed loop to receive one's hand in the closed loop and being elastic to be stretched around the housing to be stored on the housing, is characterized in that:

the carry strap has an ornamental figure which is arranged to be upstanding from the housing when the carry strap is stretched around the housing to be stored on the housing.

Preferably, the carry strap has an integral platform that is wider than the remainder of the carry strap to serve as a support base for the ornamental figure. The platform is positioned on a top face of the housing, and the ornamental figure is upstanding on the platform, when the carry strap is stretched around the housing to be stored on the housing.

DETAILED DESCRIPTION OF THE INVENTION

The invention is disclosed as being embodied preferably in a camera with a carry or wrist strap. Because the features of a camera with a carry or wrist strap are generally known, the description which follows is directed in particular only to those elements forming part of or cooperating directly with the disclosed embodiment. It is to be understood, however, that other elements may take various forms known to a person of ordinary skill in the art.

Figure 1:
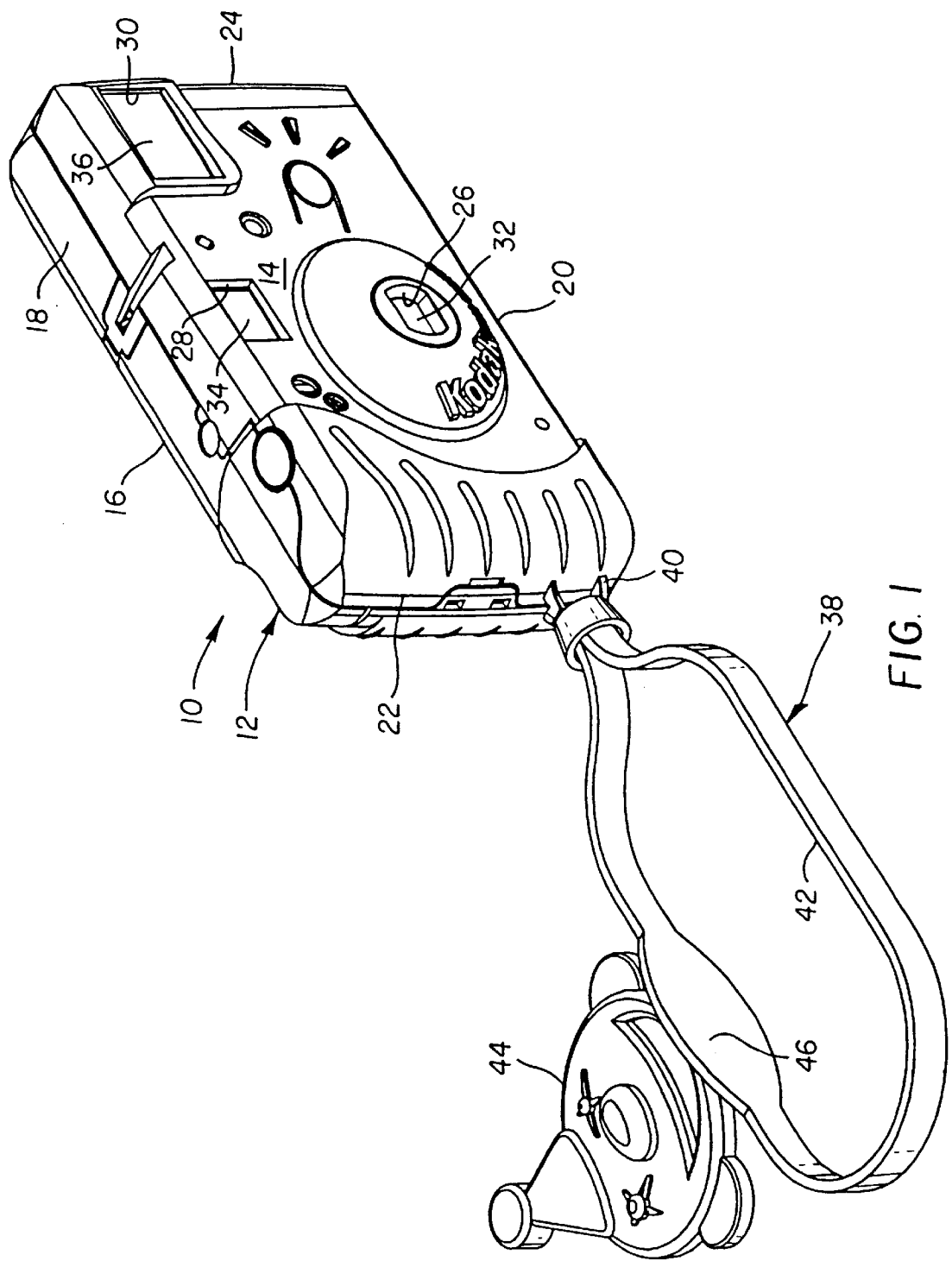
FIG. 1 is a front perspective view of a camera with a carry strap according to a preferred embodiment of the invention, showing the carry strap longitudinally extended from a housing of the camera as a closed loop to receive one's hand in the closed loop.
Figure 2:
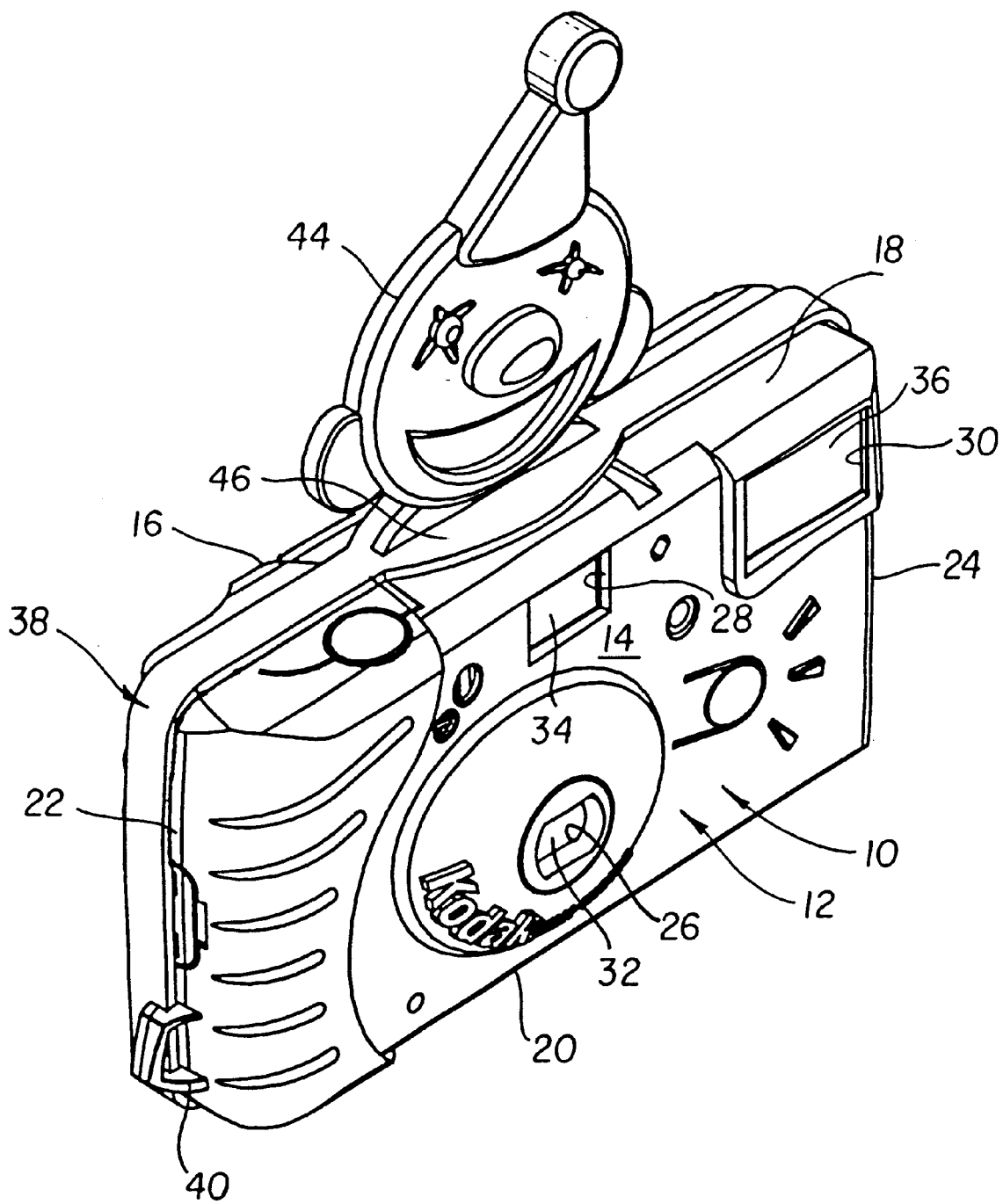
FIG. 2 is a front perspective view of the camera with the carry strap, showing the carry strap stretched around the housing to be stored on the housing.

Referring now to the drawings, FIGS. 1 and 2 show a known camera 10 including a rectangular-shaped housing 12. The housing 12 has a pair of front and rear faces 14 and 16, a pair of top and bottom faces 18 and 20, and a pair of opposite end faces 22 and 24. The front face 14 has respective lens openings 26, 28 and 30 for a taking lens 32, a front viewfinder lens, 34 and a flash cover lens 36. Although not shown, the rear face 16 has a lens opening for a rear viewfinder lens that is optically aligned with the front viewfinder lens 34. The opposite end faces 22 and 24 adjoin the front, rear, top, bottom and bottom faces 14, 16, 18 and 20 and are smaller than the front, rear, top, bottom and bottom faces.

A flexible elastic carry or wrist (terms used interchangeably) strap 38 is removably attached to the end face 22 of the housing 12 at a known holder 40 that projects from the end face. As shown in FIG. 1, the carry strap 38 can be longitudinally extended from the end face 22 as a closed loop 42. This permits one's hand to be placed in the closed loop 42, in order to use the carry strap 38. Alternatively, the carry strap 38 can be stretched as the closed loop 42 around the housing 12 as shown in FIG. 2, to longitudinally extend along the top and bottom and opposite end faces 19, 20, 22 and 24 of the housing to be stored on the housing. When stretched around the housing 12, the carry strap 38 need not be attached to the end face 22 at the holder 40.

Figure 3:
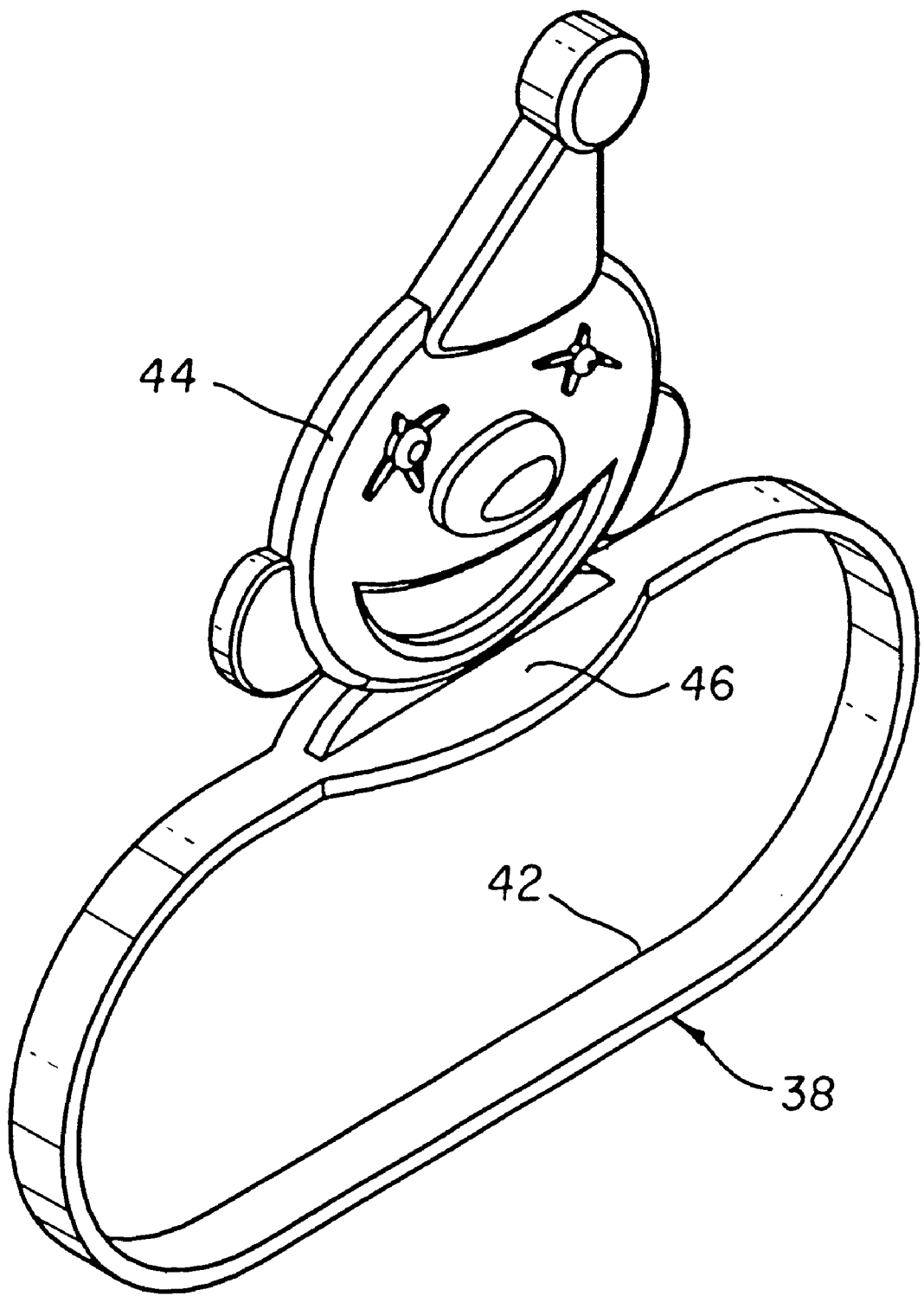
FIG. 3 is a front perspective view of the carry strap.

The carry strap 40 has an integral elastic ornamental FIG. 44. See FIG. 3. The ornamental FIG. 44 is in the bodily shape or form of an object such as a person, animal, geometric entity, letter, number, or the like, and can be two-or three-dimensional. A relatively small portion of the carry strap 38 is a flat platform 46 that is wider than the remainder of the carry strap and serves as a support base for the ornamental FIG. 44. The ornamental FIG. 44 projects at a right angle from the platform 46. This allows the ornamental FIG. 44 to be upstanding, i.e. erect, upright, from the top face 18 when the carry strap 38 is stretched about the housing 12 as shown in FIG. 2.

The invention has been described with reference to a preferred embodiment. However, it will be appreciated that variations and modifications can be effected by a person of ordinary skill in the art without departing from the scope of the invention.

PARTS LIST 10. camera
12. housing
14. front face
16. rear face
18. top face
20. bottom face
22. end face
24. end face
26. lens opening
28. lens opening
30. lens opening
32. taking lens
34. front viewfinder lens
36. flash cover lens
38. carry strap
40. holder
42. closed loop
44. ornamental FIG.
46. platform

What is claimed is:

1. A camera comprising a housing, and a carry strap attached to said housing to permit said carry strap to be longitudinally extended from said housing as a closed loop to receive one's hand in said closed loop and being elastic to be stretched around said housing to be stored on said housing, is characterized in that:

said housing has a pair of top and bottom faces and a pair of opposite end faces that adjoin said top and bottom faces and are smaller than said top and bottom faces;

said carry strap longitudinally extends along said top and bottom and opposite end faces when said carry strap is stretched around said housing to be stored on said housing, has an ornamental figure, and has an integral platform that is wider than the remainder of said carry strap to serve as a support base for said ornamental figure and that is positioned on said top face when said carry strap is stretched around said housing to be stored on said housing; and said ornamental figure is upstanding on said platform when said carry strap is stretched around said housing.

2. A camera as recited in claim 1, wherein said ornamental figure is midway between said opposite end faces when said ornamental figure is upstanding on said platform.

3. A camera as recited in claim 1, wherein said ornamental figure is elastic.

4. A camera comprising a housing that has a top face, and a carry strap attached to said housing to permit said carry strap to be longitudinally extended from said housing as a closed loop to receive one's hand in said closed loop and being elastic to be stretched around said housing including over said top face to be stored on said housing, is characterized in that:

said carry strap has an ornamental figure, and has an integral platform that is wider than the remainder of said carry strap to serve as a support base for said ornamental figure and that is positioned on said top face when said carry strap is stretched around said housing to be stored on said housing, and said ornamental figure is upstanding on said platform when said carry strap is stretched around said housing.

* * * * *